US006910882B2

(12) United States Patent
Miller et al.

(10) Patent No.: US 6,910,882 B2
(45) Date of Patent: Jun. 28, 2005

(54) VERTICAL CONVEYOR APPARATUS FOR HIGH TEMPERATURE CONTINUOUS PROCESSING OF MATERIALS

(75) Inventors: Charles Miller, Orchard Park, NY (US); William Stry, Orchard Park, NY (US); Uwe Hoechst, Niederkassel (DE); Ludger Fischer, Wachtberg (DE)

(73) Assignees: Harper International Corporation, Lancaster, NY (US); SGL Carbon AG, Wiesbaden (DE)

( * ) Notice: Subject to any disclaimer, the term of this patent is extended or adjusted under 35 U.S.C. 154(b) by 100 days.

(21) Appl. No.: 10/657,348

(22) Filed: Sep. 8, 2003

(65) Prior Publication Data

US 2004/0115115 A1 Jun. 17, 2004

Related U.S. Application Data

(60) Provisional application No. 60/408,770, filed on Sep. 6, 2002.

(51) Int. Cl.[7] .................................................. F27B 9/22
(52) U.S. Cl. ........................ 432/139; 432/154; 110/245
(58) Field of Search .............................. 432/125, 135, 432/139, 144, 154, 239; 110/346, 245, 342, 347

(56) References Cited

U.S. PATENT DOCUMENTS

| 5,388,773 A | * | 2/1995 | Perry ........................... 241/19 |
| 6,119,607 A | * | 9/2000 | Guy et al. ................... 110/346 |
| 6,357,577 B1 | * | 3/2002 | Bruke ......................... 198/625 |

* cited by examiner

*Primary Examiner*—Gregory Wilson
(74) *Attorney, Agent, or Firm*—Jaeckle Fleischmann & Mugel, LLP (57) ABSTRACT

The invention comprises, in one form thereof, a continuous processing apparatus for high temperature thermal treatment of granular materials. The apparatus includes a vertical conveyor means with an internal feed mechanism for transporting granular feedstock upward, an external export means for taking reacted product downward wherein said internal feed heats said granular feedstock by absorbing heat from the product flowing downward through said export means, and a heating means disposed around a top portion of said vertical conveyor means and said external export means.

20 Claims, 6 Drawing Sheets

VERTICAL CONVEYOR APPARATUS FOR HIGH TEMPERATURE CONTINUOUS PROCESSING OF MATERIALS

CROSS REFERENCES TO RELATED APPLICATIONS

This application claims priority to U.S. Provisional Application No. 60/408,770 filed Sep. 6, 2002.

FIELD OF THE INVENTION

This invention relates to furnaces for the heat treatment of powders and granular materials.

BACKGROUND OF THE INVENTION

The production of graphitized carbon has been practiced since the end of the $19^{th}$ century and marks the early stages of the industrial revolution. The production of graphite from so-called carbon electrodes had traditionally been carried out in the Acheson furnace in which the electrodes are typically placed in a transverse orientation to the flow of the electrical current, and surrounded by a resistor medium, thereby causing the current to pass alternately through tiers of electrodes and resistor media, the latter being typically metallurgical or petroleum coke. The Acheson process is of such ancient vintage and so well known as not to require any further description. However, it is worth noting that the process is a batch process, not particularly energy efficient and relatively labor intensive.

The LWG process, although very old, is less well known and has been practiced on a commercial scale only recently. This process is carried out by arranging the carbon electrodes in a continuous column with an electrical connection at each end of the column. See U.S. Pat. No. 1,029,121 issued to Heroult and U.S. Pat. No. 4,015,068, issued to Vohler. In the LWG process, the electrodes themselves form the dominant path for the heating current, with one or both of the ends of the column subjected to a mechanical or hydrostatic pressure source in order to keep the connection tight under expansion or contraction of the column during the heating cycle. A packing medium of granular coke is used for insulation, however, Vohler does not use a packing medium, but discloses a metal shell with a felt liner as insulation.

Carbon electrodes consist of the essentially amorphous carbon from petroleum coke which has been calcined, ground, classified by size, mixed with a binder, and bound in a matrix of amorphous carbon derived from the binder after baking at temperatures of approximately 700.degree. C. to 1100.degree. C. in a baking furnace. Graphite electrodes are produced from the carbon forms by placing them in an Acheson furnace and in recent years in a Lengthwise Graphitization (LWG) type furnace and heating them to a temperature between 2500.degree. C. to 3000.degree. C., which converts the amorphous form of carbon to the crystalline graphite, and vaporizes most of the impurities present in the original carbon, including most metals and sulfur compounds. Graphite, compared to amorphous carbon has much higher electrical and thermal conductivity, lower coefficient of thermal expansion (CTE), superior ductility and vastly superior thermal shock resistance at the operating temperatures of the electric arc steel furnace. These physical properties are uniquely valuable in the electric furnace with its need for high electrical currents, and the need to resist the mechanical and thermal shock suffered by the electrodes from the falling scrap, fluctuations in metal and electrode level, and generally high thermal stresses. Consequently, graphite is universally used as an electrode in the electric arc melting of steel.

The LWG process has many advantages over the Acheson process. The energy efficiency is much higher, as the material is heated directly instead of indirectly, and the cycle time for the process is much faster taking typically less than 12 hours as compared to 60 to 120 hours for the Acheson process. U.S. Pat. No. 4,394,766 issued to Karagoz describes an LWG furnace where "... the current is applied, heating the column of electrodes rapidly by the Joule effect to the required graphitization temperature, usually from 2400.degree.–2800.degree. C., sometimes as high as 3000.degree. C., taking approximately 4 to 12 hours, until the graphitization process is completed. The power is turned off, the furnace moved to a cooling station and the electrodes allowed to cool. When the electrodes have reached approximately 1500.degree. C.–1700.degree. C., the furnace is moved to the dump and re-load station and the transporter is replaced by a chute car with ducts leading from the dumping gates to the hoppers below. The electrodes are unloaded by a grab (stock extractor), the insulation medium is dumped at a weighted average temperature of from 700.degree. to 1100.degree. C. into the hoppers, and the furnace loaded with another electrode string and insulation charge. The chute car is removed and the furnace is transported back to the firing station." There is no heat exchange between the carbon electrodes and the graphite electrodes in this process resulting in significant energy inefficiency.

U.S. Pat. No. 5,229,225 issued to Karagoz, et al., also shows an improved LWG furnace of modular design comprising roughly semi-circular shell coupled by expansion joints in which a pressure seal is held in place by deadweights. The shell is formed of corrugated steel panels with cast-able ceramic lining. The panel design allows more freedom for thermal expansion in the transverse direction while accommodating longitudinal expansion by freedom to slide over its support cradle. The corrugated panel design also enhances faster cooling of the furnace after off-fire by improved heat transfer in comparison to a simple steel plate structure. The corrugated structure has a higher surface area than a simple plate, which gives more radiative cooling and turbulent air movement giving more convective cooling. Again however, there is no energy exchange between starting materials and finished product resulting in significant energy loss.

SUMMARY OF THE INVENTION

The invention comprises, in one form thereof, a continuous processing apparatus for high temperature thermal treatment of granular materials. The apparatus includes a vertical conveyor means with an internal feed mechanism for transporting granular feedstock upward, an external export means for taking reacted product downward wherein said internal feed heats said granular feedstock by absorbing heat from the product flowing downward through said export means, and a heating means disposed around a top portion of said vertical conveyor means and said external export means.

BRIEF DESCRIPTION OF THE DRAWINGS

The above-mentioned and other features and advantages of this invention, and the manner of attaining them, will become apparent and be better understood by reference to the following description of the embodiments of the invention in conjunction with the accompanying drawings, wherein:

FIG. 3 is a schematic of the thermal processor of FIG. 2a;

Corresponding reference characters indicate corresponding parts throughout the several views. The exemplifications set out herein illustrate the preferred embodiments of the invention and such exemplifications are not to be construed as limiting the scope of the invention in any manner.

DETAILED DESCRIPTION

Figure 1:
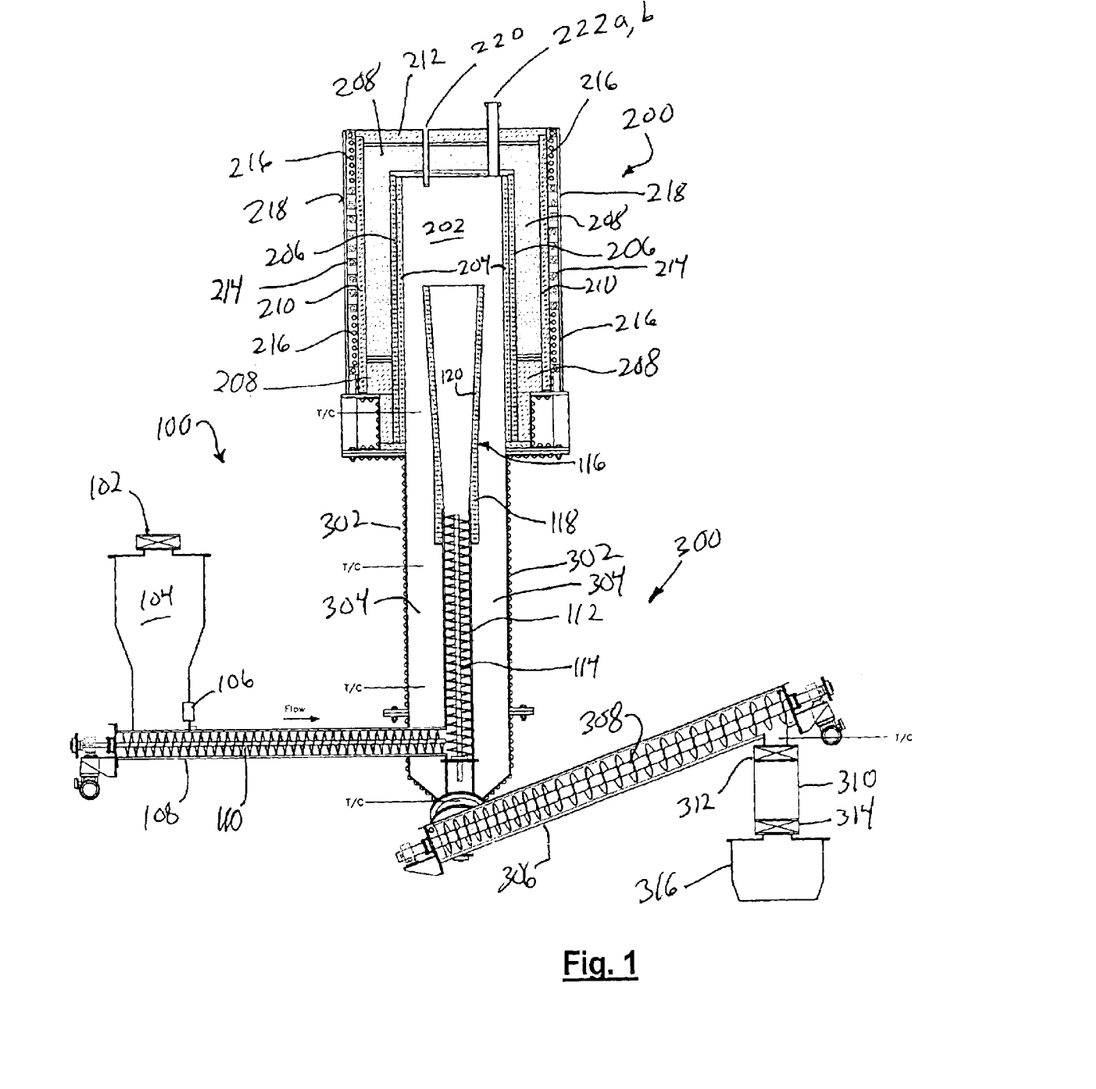
FIG. 1 is a cross-sectional view showing the structure of the vertical conveyor furnace the present invention.
Figure 2:
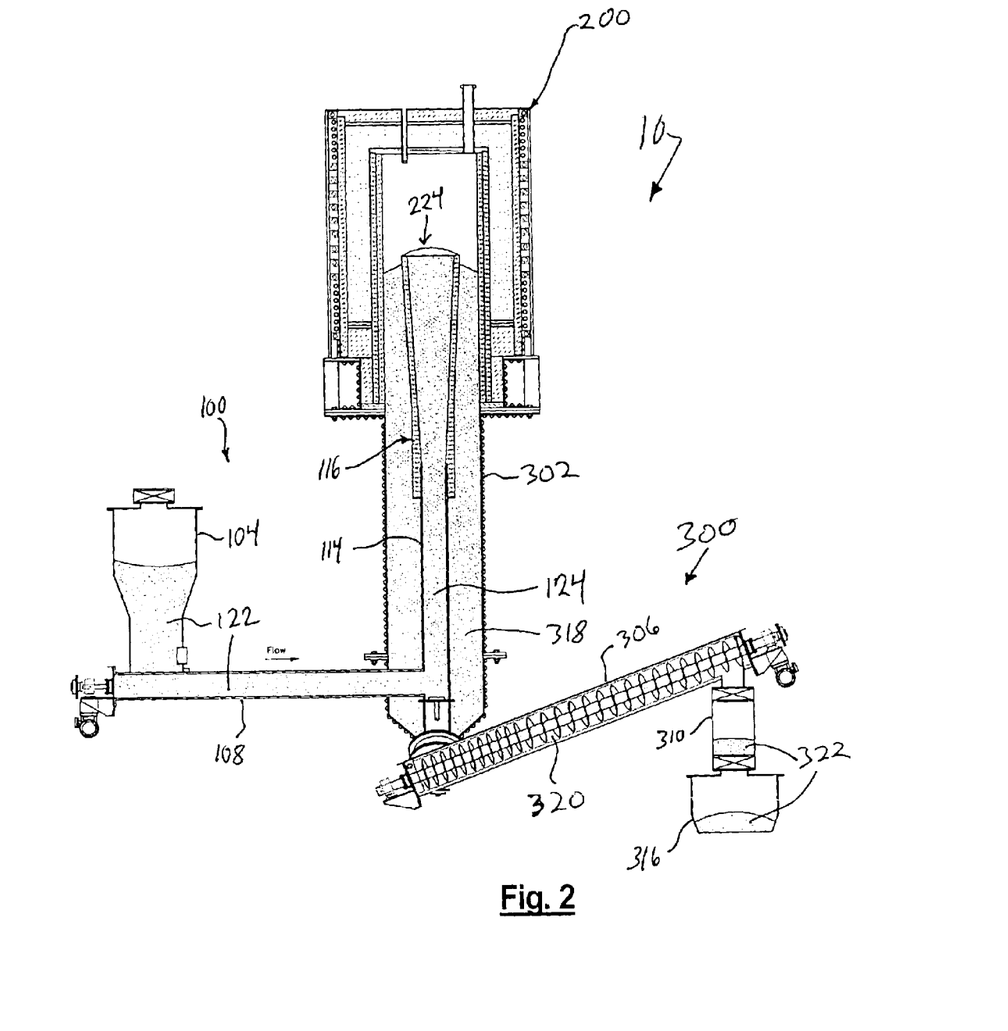
FIG. 2 is a cross-sectional view of the furnace of FIG. 1.

Referring to FIGS. 1 and 2, there is shown the vertical conveyor furnace of the present invention. The vertical conveyor furnace 10 includes an input unit 100, a heating unit 200, and an output unit 300.

The input unit 100 includes a raw material hopper 104, a raw material feed tube 108, a raw feed conveyor screw 110, a heater intake tube 112, a vertical conveyor screw 114, and a delivery cone 116. The raw material hopper 104 is isolated from ambient gasses by intake valve 102 which allows raw material 122 to be added to the raw material hopper 104 followed by a purge cycle using process-neutral gasses such as $N_2$ and Ar or mixtures thereof. The raw material hopper 104 includes a raw material level sensor 106. The raw feed conveyor screw 110 is situated within the raw material feed tube 108, which is in communication with the raw material hopper 104. The raw feed conveyor screw 110 is driven by a motor at one end to transport the raw material 122 from the raw material hopper 104 to the heater intake tube 112. The heater intake tube 112 is in communication with the raw material feed tube 108 and encloses the vertical conveyor screw 114. The heater intake tube 112 is sealed at the lower end to prevent material from falling through. The vertical conveyor screw 114 is driven at one end to transport preprocess material 124 in the upward direction into the delivery cone 116. The delivery cone 116 includes a pre-furnace portion 118 and a furnace portion 120. The pre-furnace portion 118 is somewhat cooler than the furnace portion 120 and therefore may be made of a metal such as steel. The furnace portion 120 may require high temperature resistant materials such as graphite for high temperature processes. The furnace portion 120 has an increasing diameter in the upward direction in order to reduce the outward pressure on the walls of the delivery cone 116.

The heating unit 200 may be one of many types of furnaces, for example resistance heaters, natural gas heaters, and induction furnaces. By way of example, an induction furnace is described here and shown in the drawings. The heating unit 200 includes a processing chamber 202, an inner liner 204, an outer liner 206, insulation 208, a structural heater wall 210, and a heater cover 212 in sealing engagement with the heater wall 210. The inner liner 204 and the outer liner 206 act as the suseptors in the induction heater and are preferably made of graphite. The insulation 208 may be a material such as carbon black insulation material sold under the trademark THERMAX N991 (ULTRAPURE) owned by Cancarb Limited Corporation Canada. Induction coils 214 surround the heater wall 210 in proximity to the processing chamber 202. Cooling coils 216 surround the remainder of the heater wall 210 and carry a coolant such as water. A coil retaining wall 218 secures the induction coils 214 and the cooling coils 216. A pyrometer port 220 and the exhaust ports 222a and 222b penetrate the heater cover 212 and the insulation 208 into the processing chamber 202.

The output unit 300 includes a cooling wall 302, an output passage 304 formed between the cooling wall 302 and the heater intake tube 112, an output tube 306, an output conveyor screw 308, an output isolation chamber 310, and a product hopper 316. The cooling wall 302 is preferably made of steel and is cooled by a coolant such as water. The cooling wall 302 includes a flange at the top end to support the heating unit 200. The output tube 306 is in fluid communication with the cooling wall 302 and is cooled by a coolant such as water. The output conveyor screw 308 is driven by a motor at one end to transport the cooled processed material 320 to the output isolation chamber 310. The output isolation chamber 310 includes a chamber input valve 312 and a chamber output valve 314. The chamber output valve 314 normally isolates the cooled processed material 320 and the product 322 from the ambient gasses in the product hopper 316. The chamber input valve 312 closes when the chamber output valve 314 opens so that the cooled processed material 320 remains isolated from the ambient gasses.

Figure 2A:
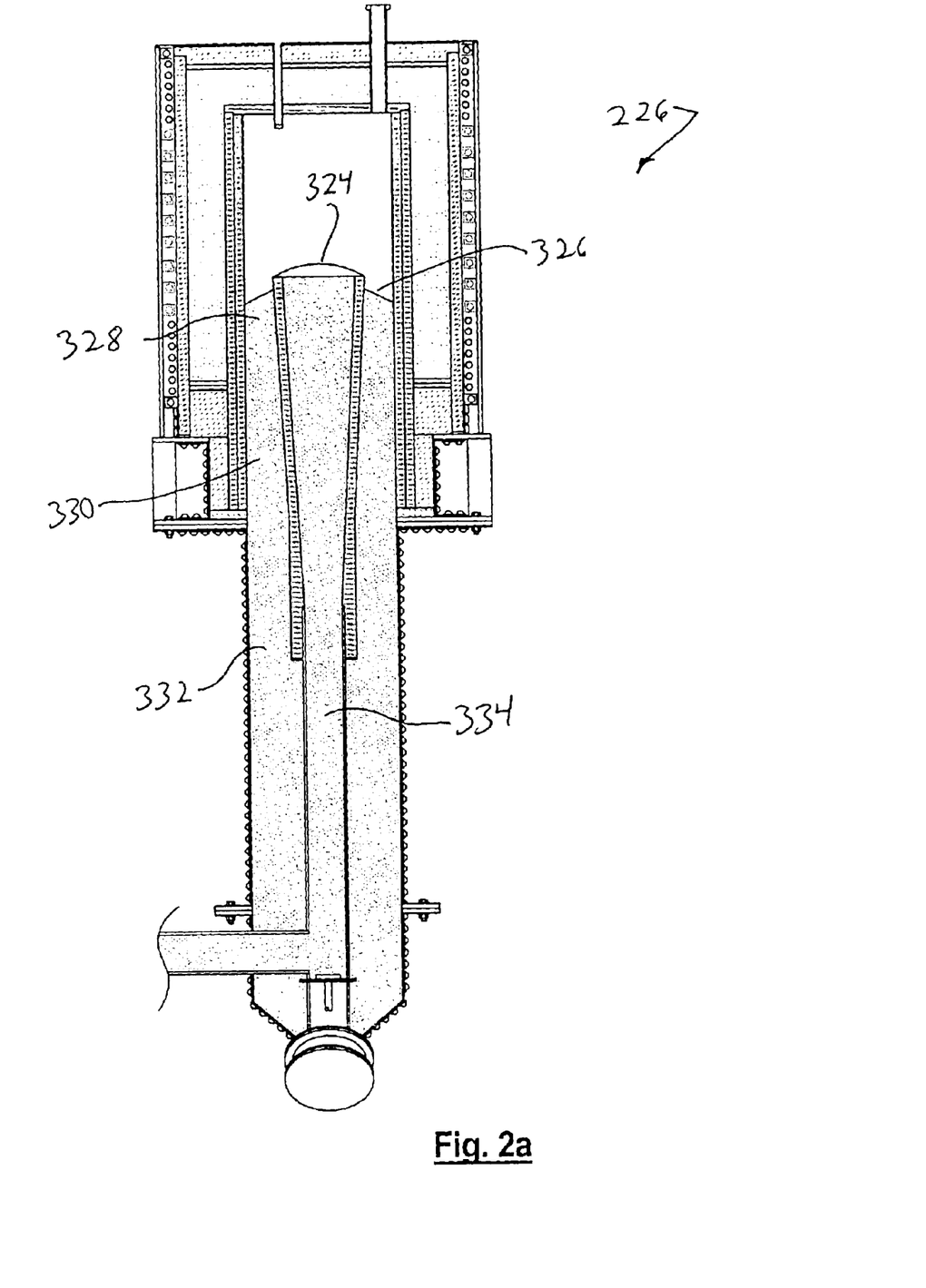
FIG. 2a is a cross-sectional view of the thermal processor of FIG. 1.
Figure 3:
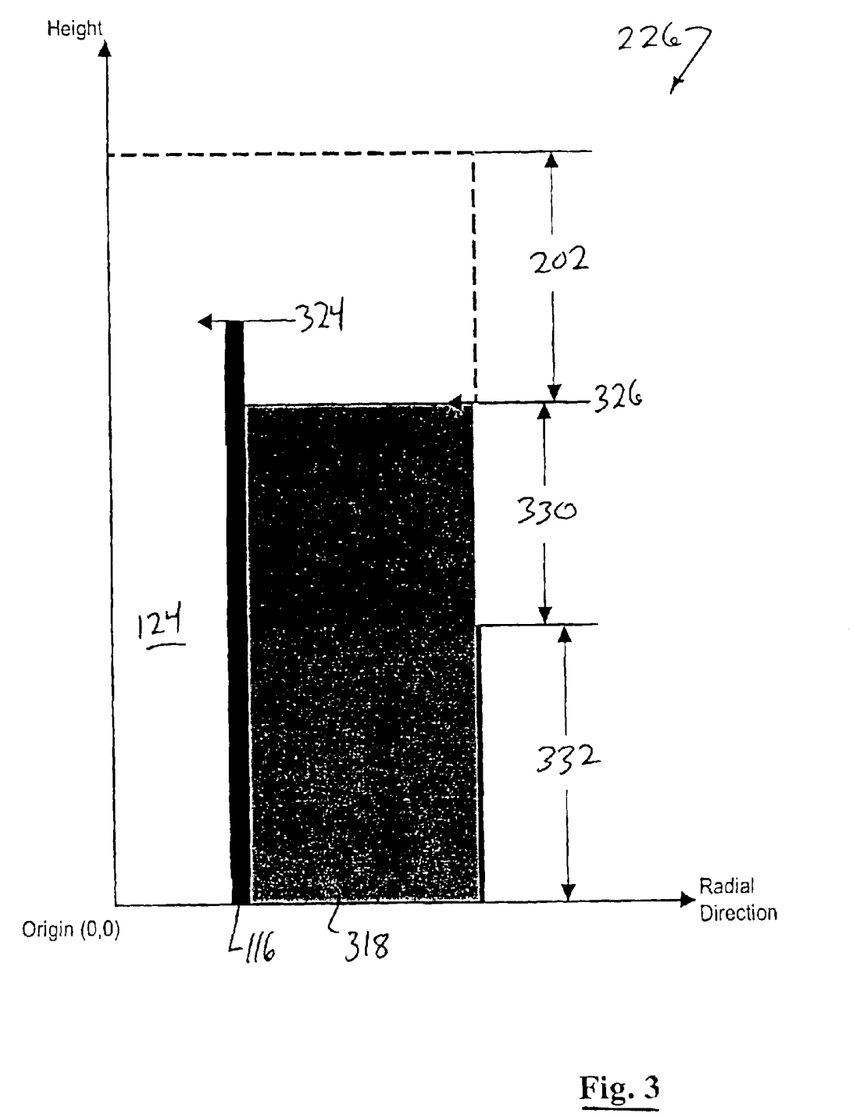

In use, granular material is fed in a feedstock hopper (104) and the feedstock reserve (122) may be purged with a desired gas or gas mixture by flowing such gas through the intake valve (102) after purging the hopper. The feedstock is then fed into raw feed tube (108) and advanced by the raw feed conveyor screw (110) into the heater intake tube (112) of the thermal processor (226). The vertical conveyor screw (114) advances the feedstock up the heater intake tube into the delivery tube (116) which is made of a high temperature compatible material such as graphite or ceramic. The delivery tube may be conical with an increasing radius it projects further into the heating section of the apparatus. The granular feedstock is pushed through the heater intake tube into the heating section, and out of the top of the intake tube falling into the output means that gravitationally feeds the thermally treated feedstock into the cooling portion of the output passage (304) downward to means for transporting the thermally treated feedstock away from the thermal treatment apparatus.

The feedstock material when thermally treated may produce unwanted gas by products. The present method anticipates this concern and allows for venting of unwanted gases by streaming relatively inert gases over the head of the feed stock in the heating section (324, 326). The treated feedstock may be transported from the thermal treatment unit by a water cooled conveyor means so that the heat build up is minimized. The feedstock can then be further cooled in an isolation chamber 310 and allowed to cool to a desired temperature limit and then released to a final product hopper 316.

In instances where the method is employed to thermally treat coke powder or granules, the feedstock is held in the intake hopper, purged and filled with nitrogen. After the purge and nitrogen flow, the hopper is sealed and the intake hopper is opened and material is advanced through the raw feed conveyor by the screw. The conveyor may have a flow of inert gas introduced to insure against seal imperfections. The screw in the raw feed conveyor is designed to compact the feed material flow to insure some degree of compaction of the feedstock into the vertical conveyor. The vertical conveyor takes the feedstock into the heating section of the equipment where the coke is heated to 900 to 2500 degrees centigrade for a relatively short period of time to graphitize the feedstock into a finished product. Typical time periods can be as short as a few minutes to complete the thermal conversion process.

An advantage of this method is that heat can be transferred from the treated product stream both in the insulated portion (330) and the heated portion (328) to the feedstock in the feed tube (108). This heat transfer increases the efficiency of the treatment process. Furthermore, the fact that the system is a continuous treatment process provides a significant increase in energy efficiency and lowers setup and labor cost relative to the state of the art batch processes.

The following examples comprising numeric models of the present invention specifically show the method and apparatus in use in order to thermally process milled coke and crushed coke.

TABLE 1

General Parameters for the Examples

| | |
|---|---|
| Production rate | 150-kg/hr |
| Process Atmosphere | $N_2$ |
| Process temperature | >2500° C. |
| Output temperature of product 322 | <150° C. |
| Vertical conveyor screw 114 length | 2-m |
| Constant Diameter upflow cross-sectional area | 0.033-$m^2$ |
| Height of cooling wall 302 | 2.5-m |
| Constant Diameter downflow cross-sectional area | 0.469-$m^2$ |
| Insulated product stream 330 length | 1.1-m |
| Process chamber 202 height | 0.4-m |
| Process chamber 202 diameter | 0.8-m |

EXAMPLE 1

TABLE 2

Example 1 Material Parameters

| | |
|---|---|
| Stock material 122 | Crushed Coke |
| Stock material 122 bulk density | 1020-kg/$m^3$ |
| Max particle size | 10-mm |

Figure 4:
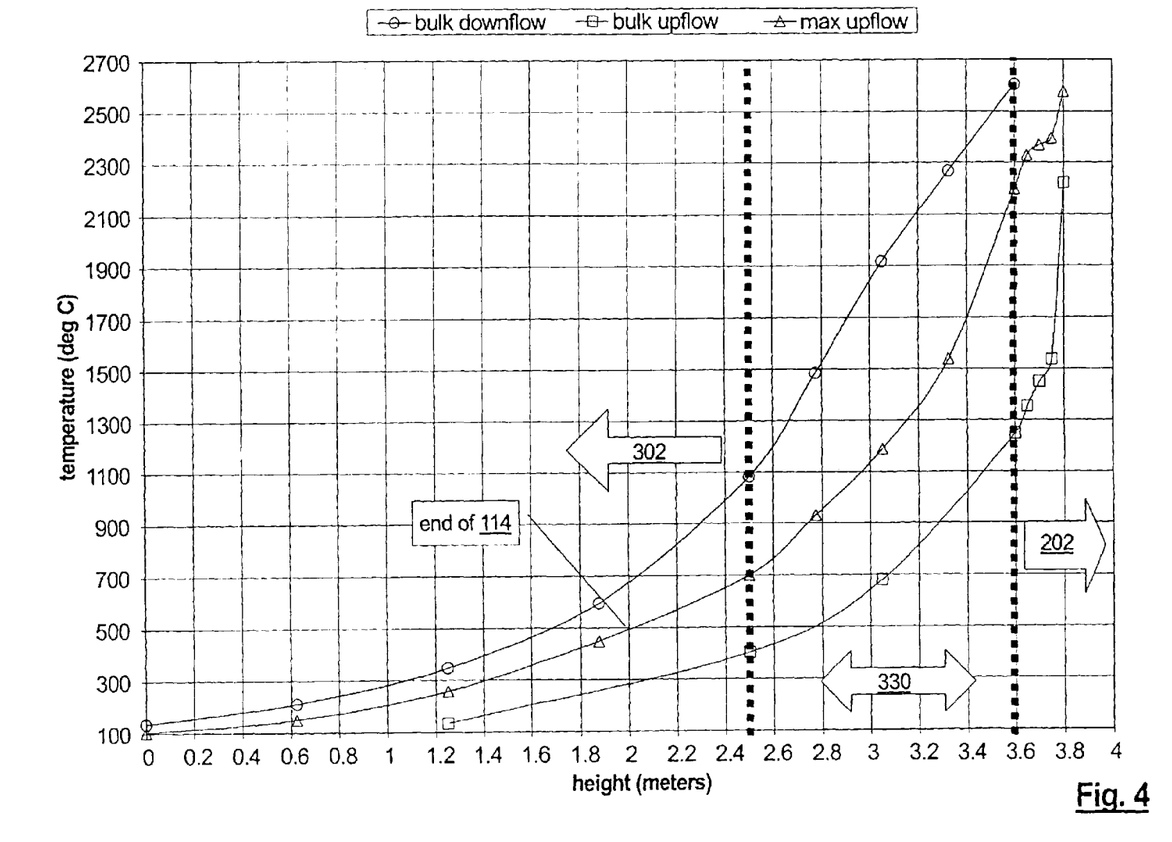
FIG. 4 is a graph of the temperature profile of Example 1.

Referring to FIG. 4 and Tables 1 and 2, Example 1 is illustrated. The maximum upflowing coke, bulk upflowing coke, and the bulk downflowing coke temperatures are plotted as a function of height. The vertical conveyor screw 114 terminates at 2.0-m, at which the temperature is predicted to be no more than 500° C. The bulk downflowing coke, after it has passed the processing surface 224 is greater than 2500° C. The upflowing coke profile demonstrates how efficient the invention is in heat recovery. The upflowing coke has been heated to at least 1000° C. by the downflowing coke before the upflowing coke reaches the actively heated processing chamber 202. This equates to about a 40% heat exchanger effectiveness between the upflowing coke and the downflowing coke.

EXAMPLE 2

TABLE 3

Example 2 Material Parameters

| | |
|---|---|
| Stock material 122 | Milled Coke |
| Stock material 122 bulk density | 670-kg/$m^3$ |
| Max particle size | 20-$\mu$m to 40-$\mu$m |

Figure 5:
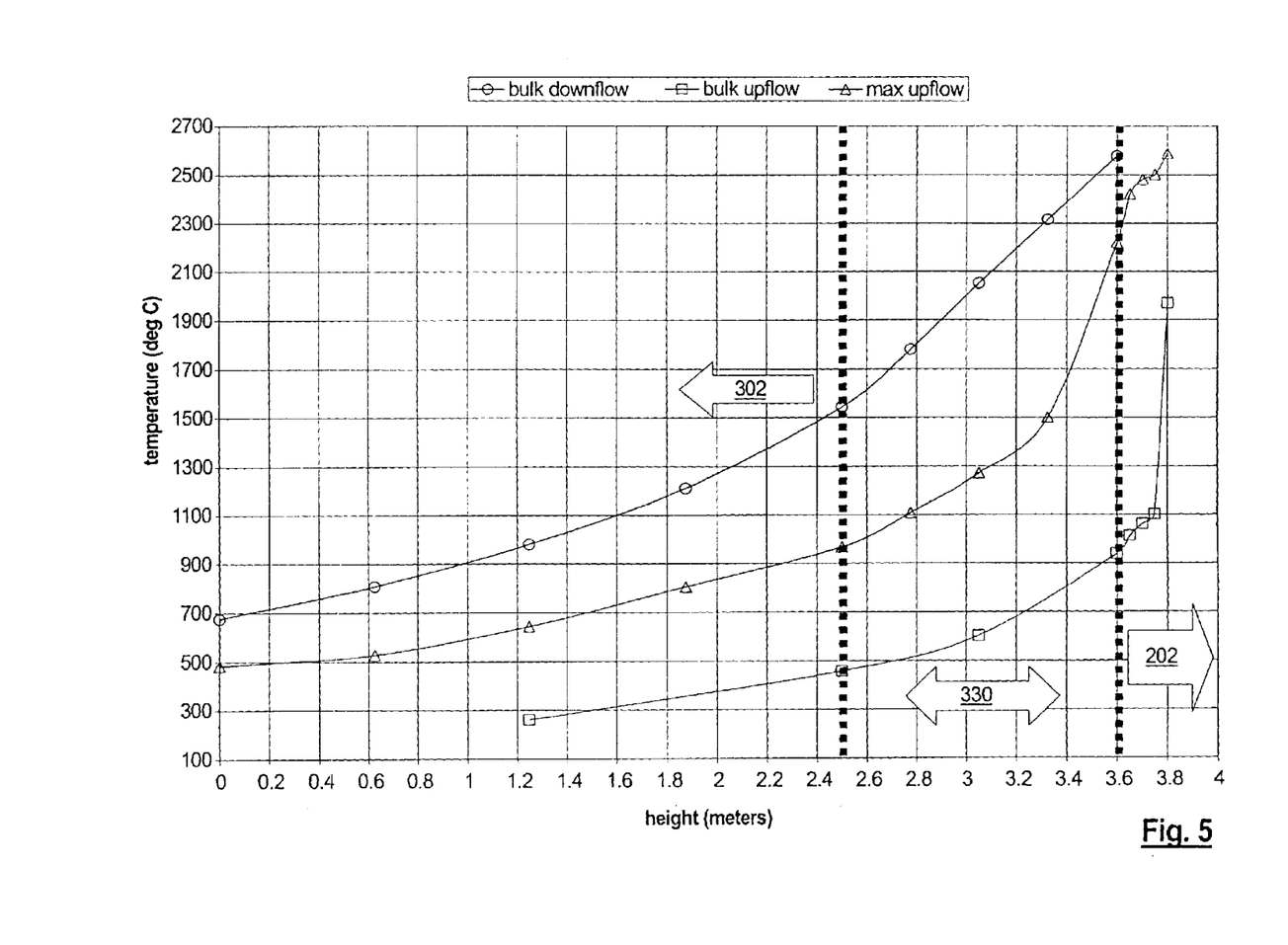
FIG. 5 is a graph of the temperature profile of Example 2.

Referring to FIG. 5 and Tables 1 and 3, Example 2 is illustrated. The milled coke is known to have a lower thermal conductivity than the crushed coke, and this is demonstrated in FIG. 5. The upflowing coke preheats to approximately 900° C. Therefore, more energy is required to bring the bulk upflow temperature to the required degree in the processing chamber 202 than in Example 1. Further, the downflowing coke does not cool down as readily and thus more work is required of the cooling output tube 306 to cool the processed material 318.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention.

Therefore, it is intended that the invention not be limited to the particular embodiments disclosed as the best mode contemplated for carrying out this invention, but that the invention will include all embodiments falling within the scope and spirit of the appended claims.

What is claimed is:

1. A continuous processing apparatus for high temperature thermal treatment of granular materials comprising:
    a vertical conveyor means with an internal feed mechanism for transporting granular feedstock upward;
    an external export means for taking reacted product downward wherein said product heats said granular feedstock by absorbing heat from the product flowing downward through said export means; and
    a heating means disposed around a top portion of said vertical conveyor means and said external export means.

2. The apparatus of claim 1 further comprising gas control means disposed in said heating means so that volatile gases produced by said thermal treatment can be removed from the product.

3. The apparatus of claim 2 further comprising a feed conveyor that provides granular feedstock to the lower portion of the vertical conveyor means.

4. The apparatus of claim 3 where the vertical conveyor means comprises;
    a metal vertical heater intake tube;
    a screw conveyor disposed in said heater intake tube that is rotatable in order to transport granular feedstock upward through said vertical intake tube; and
    a heat resistant tube communicating with the top of said vertical heater intake tube that extends into said heating means.

5. The apparatus of claim 4 wherein said heat resistant tube is made of graphite.

6. The apparatus of claim 5 wherein said graphite heat resistant tube is conical in cross section with increasing radius from bottom to top of said heat resistant tube.

7. The apparatus of claim 6 where said apparatus has a bottom cooling portion, a middle insulated portion and a top heating portion.

8. The apparatus of claim 7 wherein said cooling bottom portion has external water cooling means.

9. A continuous thermal processing apparatus for conversion of granular coke to graphite granular material comprising:
    a vertical conveyor means with an internal feed mechanism for transporting granular coke feedstock upward;
    an output tube for taking reacted granular product downward wherein said internal feed heats said granular feedstock by absorbing heat from the reacted granular feedstock flowing downward through said export means; wherein said internal feed mechanism comprises:

a vertical intake column with an feedstock entry disposed at the lower end of said vertical tube and a mechanical means for transporting said feedstock upward to the top of said;

a heat resistant column extending from the top of said first vertical column made of heat compatible material; and heating means disposed at the top portion of said heat resistant column where heating means that would allow granular coke feedstock to be heated to high temperature above 2000 degrees centigrade.

10. The apparatus of 9 wherein said heating means also has gas flow means so that volatile gases produced by heating said granular coke feedstock may be removed as said feedstock is being graphitized.

11. The apparatus of claim 10 wherein said heat resistant column has an increased radius on the end distal from said first vertical column.

12. The apparatus of claim 10 wherein said heating means is an inductive heating chamber.

13. The apparatus of claim 12 wherein the outer portions of said heating means are insulated from an inductive coil and from a graphite susceptor.

14. The apparatus of claim 9 wherein said heat resistant column is made from high temperature ceramic material.

15. The apparatus of claim 9 wherein said output tube is a gravity fed column formed around said internal feed mechanism and said outer surface of output tube is water cooled.

16. The apparatus of claim 9 wherein said apparatus has a bottom cooling portion, a middle insulated portion and a top heating portion.

17. A method for high temperature thermal treatment of granulated material comprising:

continuously providing a supply of granulated feedstock to the bottom portion of a vertical conveyance means;

continuously controlling the atmosphere into said vertical conveyance means;

transporting said feedstock into a heating section maintained at least 2000 degrees centigrade;

transferring said feedstock into a gravity fed means designed to keep said feedstock in said heating section for a determined period of time to allow thermal conversion of said feedstock into granular product; and transporting said granular product past a heat transfer wall so that said granular product transfers energy to said granulated feedstock.

18. The method of claim 17 wherein when said feedstock is in said heating section nitrogen gas is continuously exchanged over the top of said feedstock flow to remove volatiles.

19. A method for high temperature thermal treatment of granulated coke comprising:

continuously providing a supply of granulated coke to the bottom portion of a vertical conveyance means;

continuously controlling the atmosphere into said vertical conveyance means;

transporting said granulated coke into a heating section maintained at least 2500 degrees centigrade;

transferring said granulated coke into a gravity fed means designed to keep said granulated coke in said heating section for a determined period of time to allow thermal conversion to granulated coke; and transporting said granulated coke past a heat transfer wall so that energy is transferred to said granulated coke.

20. The method of claim 19 wherein when said granulated coke is in said heating section a gas chosen from nitrogen or argon is continuously exchanged over the top of said granulated coke to remove volatiles produced by the high temperature.

* * * * *